United States Patent [19]
Kawai et al.

[11] Patent Number: 6,024,457
[45] Date of Patent: Feb. 15, 2000

[54] LENS BARREL

[75] Inventors: Sumio Kawai, Hachioji; Tatsuya Suzuki, Tokyo; Shinya Takahashi, Hino; Tamotsu Koiwai, Akiruno; Kunio Yokoyama, Hino, all of Japan

[73] Assignee: Olympus Optical Co., Ltd., Tokyo, Japan

[21] Appl. No.: 09/062,763

[22] Filed: Apr. 17, 1998

[30] Foreign Application Priority Data

Apr. 18, 1997 [JP] Japan ................................ H9-101974
Apr. 2, 1998 [JP] Japan ................................ H10-090268

[51] Int. Cl.$^7$ .......................... G02B 21/00; G02B 27/00; G02B 7/02
[52] U.S. Cl. .......................... 359/611; 359/601; 359/819; 359/823
[58] Field of Search .......................... 359/819, 694–699, 359/738, 822–823, 601, 611–615

[56] References Cited

U.S. PATENT DOCUMENTS 5,365,373  11/1994  Tanaka ................................ 359/601
5,450,239  9/1995  Uziie et al. ........................... 359/601

FOREIGN PATENT DOCUMENTS

5-61711  8/1993  Japan .

*Primary Examiner*—Georgia Epps
*Assistant Examiner*—Suzanne Letendre
*Attorney, Agent, or Firm*—Louis Weinstein

[57] ABSTRACT

A lens barrel is provided with: first and second lens frames which are adapted to be able to make a relative displacement therebetween and are adapted so that an inner peripheral portion of one of the first and second lens frames overlaps with an outer peripheral portion of the other lens frame in a used state; a light shielding portion, which is provided at one end portion of the first lens frame, for blocking light which is incident from the end portion in the used state; and a pressure-contact light shield member that is provided at a place which is nearer to an other end portion of the first lens frame than the light shielding portion provided at the one end portion thereof and that is adapted to be elastically deformed by being pressure-contacted to the outer peripheral portion of the second lens frame, thereby blocking light transmitted by the light shielding portion provided at the one end portion of the first lens frame.

19 Claims, 6 Drawing Sheets

LENS BARREL

BACKGROUND OF THE INVENTION

1. Field of the Invention

This invention generally relates to a lens barrel and more particularly, to a lens barrel that has a light shielding (namely, intercepting or blocking) portion for preventing light rays from being incident through an opening between barrels which are adapted to move relatively in a direction of an optical axis and/or in a direction of rotation thereof.

2. Related Art Statement

A camera provided with zooming and collapsing functions has a lens barrel consisting of a plurality of barrels such as a lens cylinder, a linearly (or rectilinearly) movable (or moving) cylinder, a rotary (or rotating) cylinder and a stationary (or fixed) cylinder. Such a type of camera realizes (or implements) the aforementioned zooming and collapsing functions by relatively displacing the aforesaid barrels or displacing the aforementioned barrels relative to an outer cover for a camera main body in a direction of an optical axis and/or in a direction of rotation thereof.

In the aforementioned lens barrel, small gaps are provided between the barrels facing each other and between the barrel and the outer cover for the camera main body, respectively, so as to reduce a drive (or driving) load at the time of relatively displacing the barrels. If adequate measures are not taken to block light at the gaps, there is caused a defect in that unnecessary external (or extraneous) light enters directly the main unit of a camera or indirectly therein (after undergoing secondary reflection or scattering) and then reaches a film surface and thus a film is exposed to the light.

Therefore, there has been made various propositions for preventing external light from entering the camera main body through the aforementioned gaps. For example, in Japanese Unexamined Utility Model Publication No. 5-61711 Official Gazette, there has been proposed the following light shielding device for use in a camera.

Figure 10:
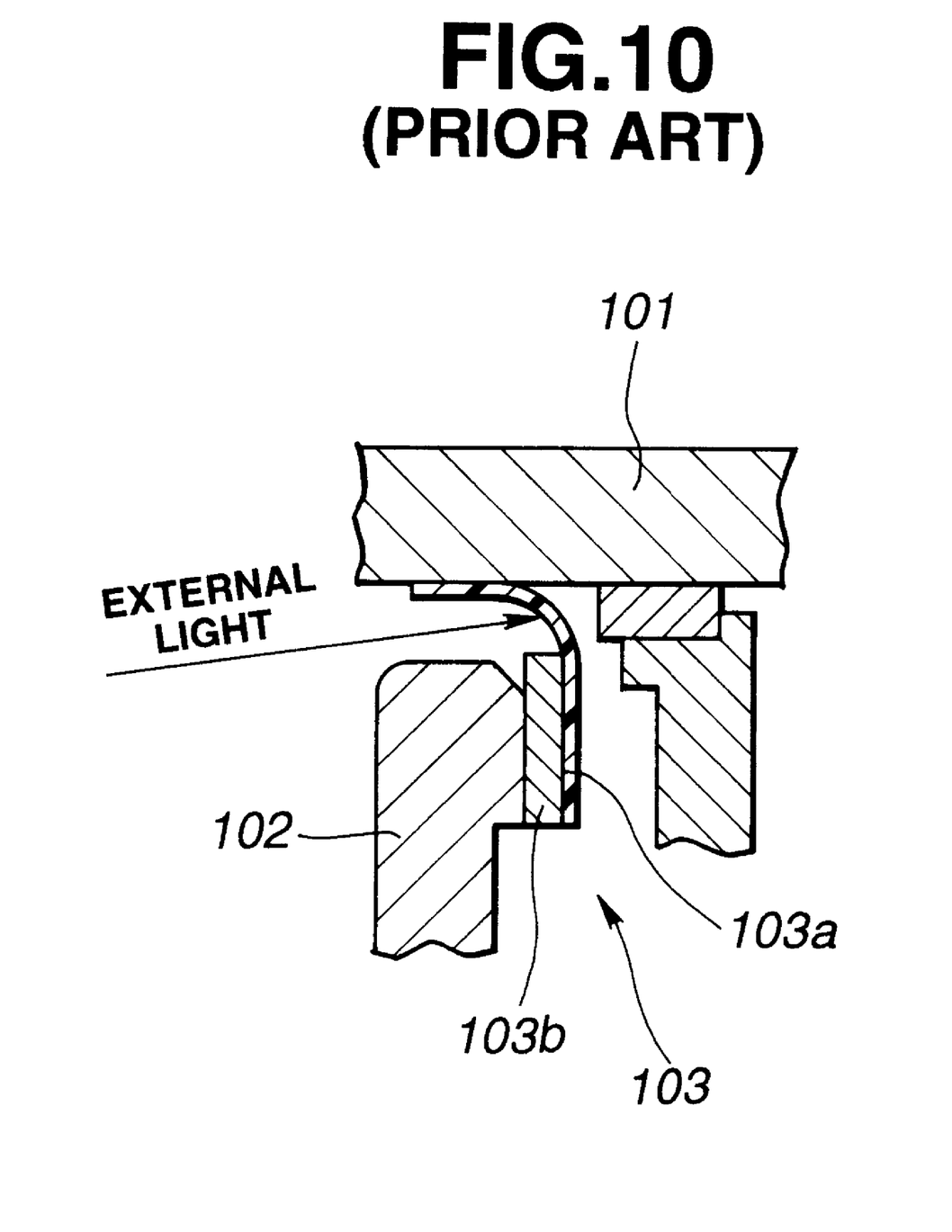
FIG. 10 is an enlarged sectional view of a primary part of an example of a light shielding member provided in a conventional lens barrel.

Namely, as shown in FIG. 10, the aforesaid light shielding device has a light shielding member 103 formed by sticking (or putting) a ring-like synthetic resin sheet member 103a, whose inside (or inner) diameter is less than the outside (or outer) diameter of a movable cylinder 101 for holding a (picture) taking lens, onto a ring-like light shielding (or intercepting) sheet base plate 103b. Further, the aforesaid light shielding member 103 is fixed to a front cover 102 of the camera main body. Then, the aforementioned sheet member 103a is pressure-connected (or pressure-contacted) to and is brought into surface contact with the aforementioned movable cylinder 101. Thus, external light is prevented from entering the camera main body through the gap between the movable cylinder 101 and the front cover 102 thereof.

There have been employed light shielding devices, most of which have the configuration as above described.

Meanwhile, the light shielding device for use in a camera, which is proposed in the aforesaid Japanese Unexamined Utility Model Publication No. 5-61711 Official Gazette, is a mechanism by which the shielding of light is achieved by bringing only a single elastic (or resilient) light shielding means (corresponding to the sheet member 103a in the aforementioned example of the device) into surface contact with the surface of the inner wall of the movable cylinder. However, the light shielding device of such a configuration has encountered problems that the surface contact is unstable in the case where the aforesaid movable cylinder is eccentric with respect to an optical axis and that thus the complete light shielding performance cannot be obtained.

On the other hand, in recent years, there have been increasing demands for miniaturization of a camera. This exerts an influence on barrels. Further, when miniaturizing the barrels, there arises a necessity for miniaturizing a light shielding device incorporated in a camera.

However, when miniaturizing the aforementioned light shielding device, there is a fear that the following drawbacks, especially, deterioration in light-shielding performance may be caused.

To begin with, drawbacks caused in the case of reducing the size in a direction (namely, in a radial direction), which is perpendicular to an optical axis, of the aforementioned elastic light shielding means will be described hereinbelow.

First, in the case where it is intended that the miniaturization is achieved by reducing the outside diameter of a supporting member (corresponding to the light shielding sheet base plate 103b) for the elastic light shielding means (corresponding to the sheet member 103a), the mounting strength of the aforesaid sheet member decreases. Thus, the contact of the aforesaid sheet member with the movable cylinder 101 becomes unstable. Consequently, there is caused a drawback in that the complete light shielding performance cannot be obtained.

Namely, when reducing the outside diameter of the aforesaid supporting member, the stiffness (or rigidity) of the aforesaid supporting member itself decreases. The relative displacement between the barrels causes deformation of the supporting member, which receives a force exerted in a direction of an optical axis, into a cone-like (or conical-spring-like) form. Thus, an amount of lap in the sheet member decreases. Consequently, there is caused a drawback in that unnecessary light enters the camera main body.

Second, in the case where it is intended that the miniaturization is attained by reducing the inside diameter of the aforementioned supporting member without changing the thickness in the radial direction thereof and by further cutting a lap portion of the aforementioned supporting member, the amount of the remaining lap may be small according to the quantity of the cut lap. In this case, owing to the eccentricity of the barrel (namely, the movable cylinder), there is caused a drawback in that external light is liable to leak into the camera main body.

Moreover, the curvature of a bending (or bent) portion of the sheet member decreases. Thus, there is caused another drawback in that a load imposed on the barrel increases. Namely, even if the sheet member is formed in such a manner as to be thin to some extent, a rather large load is produced between the barrel and the sheet member, with the result that the drive load between the barrels increases.

Next, drawbacks caused in the case of reducing the size in the direction of the optical axis (or the optical axis direction) of the aforementioned elastic light shielding means will be described hereunder.

First, in the case where it is intended that an amount of lap in a portion in the optical axis direction of the aforementioned sheet member 103a, at which the sheet member 103 is in contact with the movable cylinder 101, is reduced, there is caused a drawback in that external light is liable to leak into the camera main body, similarly as in the aforementioned case. Further, the curvature of a bending portion of the sheet member decreases. Thus, similarly as in the aforementioned case, there is caused another drawback in that a load imposed on the barrel increases.

Second, in the case where it is intended that the miniaturization is achieved by reducing the sheet thickness of the sheet member, the light blocking quality of the aforesaid sheet member itself is degraded. Namely, in the case where the sheet member is formed in such a manner that the sheet thickness thereof is small, external light is transmitted by the sheet member when the external light impinges directly on the sheet member. In addition, when light rays are transmitted by the sheet member, the light rays are scattered. Thus, there is caused a drawback in that a wide range of a film surface is exposed to the light rays having been incident in a camera.

Third, in the case where it is intended that the miniaturization is attained by reducing the thickness of the supporting member for supporting the sheet member, the stiffness of the sheet member is degraded. Thus, the contact of the sheet member with the movable cylinder becomes unstable. Consequently, similarly as in the aforementioned case, there is caused another drawback in that the complete light shielding performance cannot be obtained.

SUMMARY OF THE INVENTION

A first object of this invention is to provide a lens barrel having light shielding means which can block external light reliably even if the lens barrel is eccentric with respect to an axis thereof.

A second object of this invention is to provide a lens barrel having light shielding means which can block light reliably even when the lens barrel is miniaturized with the miniaturization of a camera.

In brief, a lens barrel of the present invention comprising:

first and second lens frames, which are adapted to make a relative displacement therebetween and are adapted so that an inner peripheral portion of one of the aforesaid first and second lens frames overlaps with an outer peripheral portion of the other lens frame in a used or working state (or condition);

a light shielding portion, which is provided at one end portion of the aforesaid first lens frame, for blocking light which is incident from the aforesaid end portion in the aforesaid used state; and a pressure-contact light shield member that is provided at a place which is nearer to the other end portion of the aforesaid first lens frame than the aforesaid light shielding portion provided at the one end portion thereof and that is adapted to be elastically deformed by being pressure-contacted to the outer peripheral portion of the aforesaid second lens frame, thereby finally blocking light transmitted by the aforesaid light shielding portion provided at the one end portion of the aforesaid first lens frame.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

Hereinafter, the preferred embodiments of the present invention will be described in detail by referring to the accompanying drawings.

Figure 1:
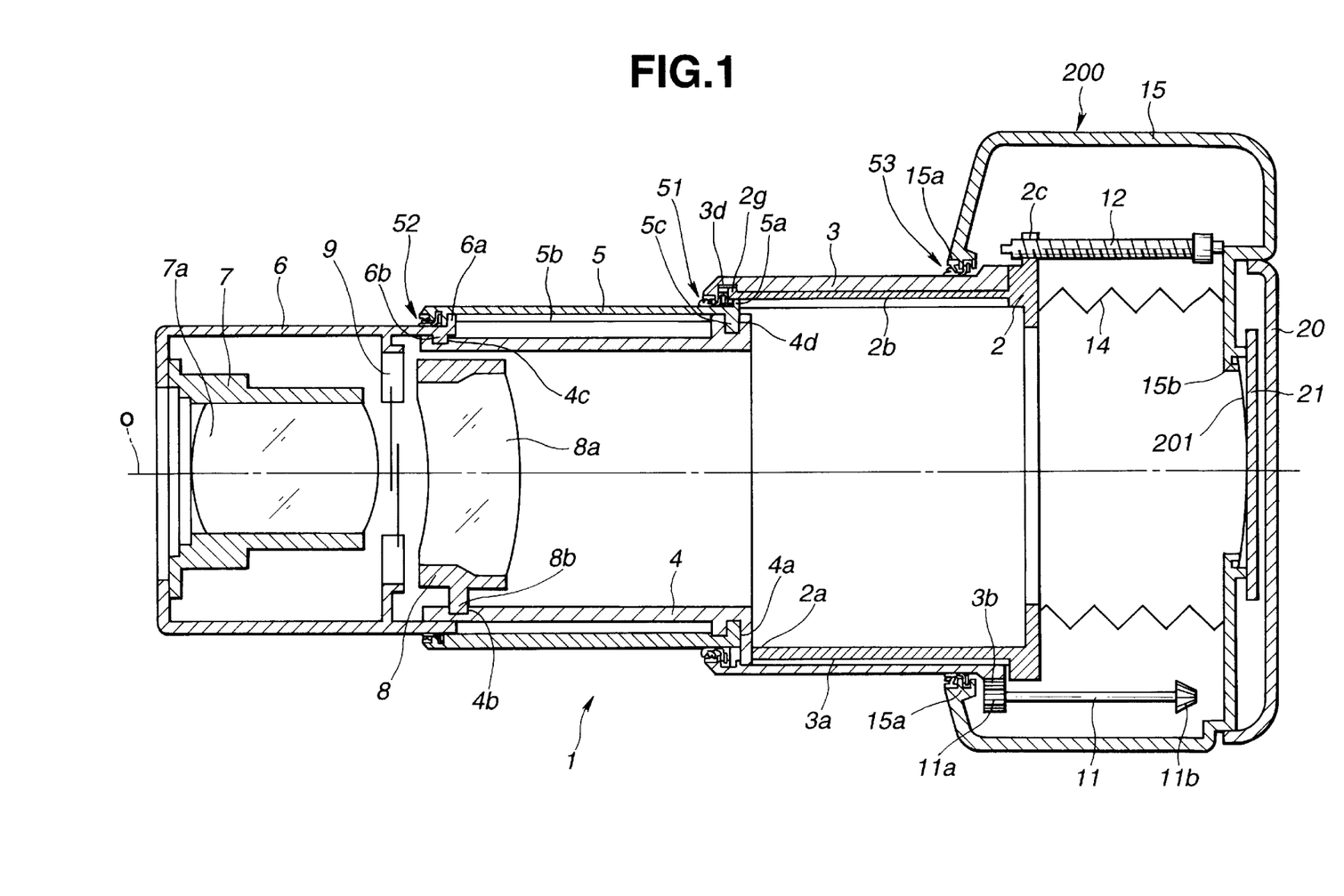
FIG. 1 is a longitudinal sectional view taken on a central (or center) line of a camera having a lens barrel which is a first embodiment of the present invention.

FIGS. 1 to 5 relate to the first embodiment of the present invention. FIG. 1 is a longitudinal sectional view taken on the central line of a camera having a lens barrel which is the first embodiment of the present invention.

Lens barrel of this first embodiment is a zoom lens barrel of the collapsible mount type.

Lens barrel 1 includes a movable cylinder (or barrel), which can freely move forward and backward between a collapsed position, where the lens barrel is stored in the camera main body, and a projected position, where a picture can be taken by the camera, and further includes a stationary cylinder.

Camera main body 200 having this lens barrel 1 includes a camera body (not shown), an outer cover 15 and a rear cover 20, which covers this camera body.

Film (guide) rail 15b for positioning film 201 in the direction of an optical axis is formed in the aforementioned camera body. Pressure plate 21 for pushing the film is attached to the rear cover 20. Further, the aforementioned lens barrel 1 projects from an aperture portion 15a formed in front of the aforementioned outer cover 15 in such a way a to face the film 201 positioned at a picture taking position, and is collapsibly disposed in front of the camera main body 200.

The aforementioned lens barrel 1 includes:

a rotary cylinder 3, which is fitted into a collapsing stationary cylinder 2 and acts as a zooming outer frame that is rotatably provided with respect to the stationary cylinder 2;

a cam cylinder 4 driven by a cam of the stationary cylinder 2 in such a way as to move forward and backward with the progress of a rotating operation of the rotary cylinder 3;

a linearly movable cylinder 5 which is relatively rotatably fitted into cam cylinder 4 and is guided by the stationary cylinder 2 and is driven in such a manner as to move forward and backward simultaneously with the aforesaid cam cylinder 4;

a lens holding cylinder 6 which is fitted into the aforesaid cam cylinder 4 and is restrained by the aforementioned linearly movable cylinder 5 and is driven by the cam of the cam cylinder 4 in such a fashion as to move forward and rearward;

a first lens frame 7, is supported by lens holding cylinder 6 in such a way as to be able to move forward and backward, for holding a first group lens 7a serving as a focusing lens;

a shutter 9 adapted to move forward and backward in such a manner as to be integral with the aforementioned lens holding cylinder 6; and a second lens frame 8, which is driven by the aforesaid cam cylinder 4 in such way as to move forward and rearward, for holding a second group lens 8a acting as a zooming (or zoom) lens.

An outward flange is formed at a base end portion of the aforementioned stationary cylinder 2. Female (internal) thread 2c is threaded in this flange. This female thread 2c is engaged with an externally threaded axle 12. When this threaded axle 12 is rotated by a drive force provided from a drive unit (not shown) placed in the camera main body, the aforementioned cylinder 2 is moved forward or backward to the collapsed position or the projected position.

The aforesaid rotary cylinder 3 is rotatably fitted into the outer peripheral surface of the aforementioned stationary cylinder 2. Peripheral groove 3d is provided in the inner peripheral surface portion of an end (or edge) portion of this rotary cylinder 3. Flange 2g formed on the outer periphery of the end portion of the aforementioned stationary cylinder 2 is fitted into this peripheral groove 3d, so that the relative displacement in an optical axis direction of the aforementioned rotary cylinder 3 with respect to the stationary cylinder 2 is restricted.

Further, a drive (or driving) gear 3b is formed on the base-end-side outer peripheral surface of the aforementioned rotary cylinder 3. This gear 3b engages with a pinion gear 11a fixed at an end of a zooming drive axle 11. Incidentally, a gear of a zoom drive unit (not shown) provided in the camera body is engaged with a transmission gear 11b fixed at the other end of this zooming drive axle 11.

Moreover, a pin 5a for a rectilinear guide is protrusively formed on the base-end-side outer peripheral surface of the aforesaid linearly movable cylinder 5 to be fitted into the inner peripheral surface of the aforementioned stationary cylinder 2. This pin 5a engages a rectilinear groove 2b formed in an optical axis direction in the inner surface portion of the aforementioned cylinder 2. Thus, the displacement of the linearly movable cylinder 5 is restricted in such a manner that the cylinder 5 can move only in an optical axis direction.

The aforementioned cam cylinder 4 is rotatably fitted into the inside of the aforementioned linearly movable cylinder 5. Peripheral groove 4d is provided in the base-end-side outer peripheral surface portion of this cam cylinder 4. Inward projecting row (or ridge) 5c formed on the base-end-side portion of the aforementioned linearly movable cylinder 5 is fitted into this peripheral groove 4d, so that the relative displacement in the optical axis direction of the cam cylinder 4d with respect to the aforementioned linearly movable cylinder 5 is restrained.

Moreover, a zooming pin 4a is outwardly protrusively formed on the base-end-side of the cam cylinder 4. This pin 4a is fitted into an inclined cam slot 2a, which is bored like a partially circular arc in the aforementioned-stationary cylinder 2, and into a rectilinear groove 3a bored in the inner peripheral surface portion of the aforementioned rotary cylinder 3 in the optical axis direction.

Furthermore, a partially-circular-arc-like inclined cam groove 4b is provided in the inner peripheral surface portion of the aforesaid cam cylinder 4. Pin 8b, which is protrusively formed on the aforementioned second lens frame 8, is fitted into this cam groove 4b.

The aforementioned lens holding cylinder 6 is fitted into the outer peripheral portion of the aforesaid cam cylinder 4 and into the inner peripheral surface portion of the aforesaid linearly movable cylinder 5. Pins 6b and 6a are protrusively formed on the base-end-side inner and outer surfaces of lens holding cylinder 6, respectively. The aforementioned inwardly projecting pin 6b is fitted into an inclined cam groove 4c provided like a partially circular arc on the outer peripheral surface of the aforementioned cam cylinder 4, while the outwardly projecting pin 6a is fitted into the rectilinear groove 5b provided in the optical axis direction on the inner peripheral surface of the aforementioned linearly movable cylinder 5.

The aforementioned first lens frame 7 is disposed in the inner side of the end portion of the aforesaid lens holding cylinder 6. Further, a drive mechanism (not shown) for focusing by rectilinearly moving the aforementioned first lens frame 7 in the optical axis direction is provided on lens holding cylinder 6. Moreover, the shutter 9 is provided in the rear of the aforementioned first lens frame 7 in the lens holding cylinder 6.

Furthermore, a bellows 14 is provided between the inward flange, which is placed on the base-end-side of the aforementioned stationary cylinder 2, and the rear-side inner wall of the aforementioned outer cover 15. Thus, bellows 14 maintains the light-tightness relative to the film 201 together with the aforementioned rear cover 20. Incidentally, the aforementioned bellows 14 is adapted in such a manner as to expand and contract in response to the projecting operation and the collapsing operation of the lens barrel 1 being respectively performed.

Operation of the lens barrel 1 configured in this manner will be described briefly hereinafter.

First, the threaded axle 12 is rotated by a drive force supplied from a drive unit (not shown), so that the lens barrel 1 having been placed at the collapsed position is let out to the (picture) taking position. Moreover, when a drive force is transmitted from a zoom drive unit (not shown) to the rotary cylinder 3 through the pinion gear 11a after the lens barrel 1 is let out to the taking position, the rotary cylinder 3 rotates.

Turning force (or torque) of this rotary cylinder 3 is transmitted to the zooming pin 4a which is fitted into the rectilinear groove 3a. When the zooming pin 4a is rotated along the cam slot 2a, the cam cylinder 4 moves forward and backward in the optical axis direction while rotating around the optical axis O with respect to the aforementioned stationary cylinder 2. In such a case, as the aforementioned cam cylinder 4 moves, the linearly movable cylinder 5 moves forward and backward together with the-aforesaid cam cylinder 4 in the optical axis direction as a single unit in a state in which the linearly movable cylinder 5 does not rotate.

Furthermore, when the aforementioned cam cylinder 4 rotates, this turning force is transmitted by the pins 6b and 8b, which are respectively fitted into the cam grooves 4c and 4b, to the lens holding cylinder 6 and the second lens frame 8. Thus, the aforementioned lens holding cylinder 6 is moved relatively and linearly with respect to the aforementioned linearly movable cylinder 5 in the optical axis direction. In addition, the aforementioned second lens frame 8 moves forward and rearward relatively with respect to the aforesaid linearly movable cylinder 5 in the optical axis direction.

The positions of the first group lens 7a and the second group lens 8a are controlled by performing such operations. The aforementioned lens cylinder 1 operates retractably from a tele-position to a wide position in an optical axis. Incidentally, FIG. 1 illustrates a state in which the lenses 7a and 8a are set at the long focus side.

Light shielding portions 51, 52 and 53 are provided on the inner peripheral part of the end portion of the aforesaid rotary cylinder 3, on the inner peripheral part of the end portion of the aforementioned linearly movable cylinder 5 and on the aperture portion 15a of the aforesaid outer cover 15 in the-lens barrel 1 constructed in such a manner.

Next, the configurations of the aforementioned light shielding portions 51, 52 and 53 will be described hereinafter by referring to FIGS. 2 to 5. Incidentally, although the configuration of the light shielding portion 51 will be described hereinbelow as a typical example thereof, the configurations of the aforesaid light shielding portions 52 and 53 are similar to the configuration of the light shielding portion 51.

Figure 2:
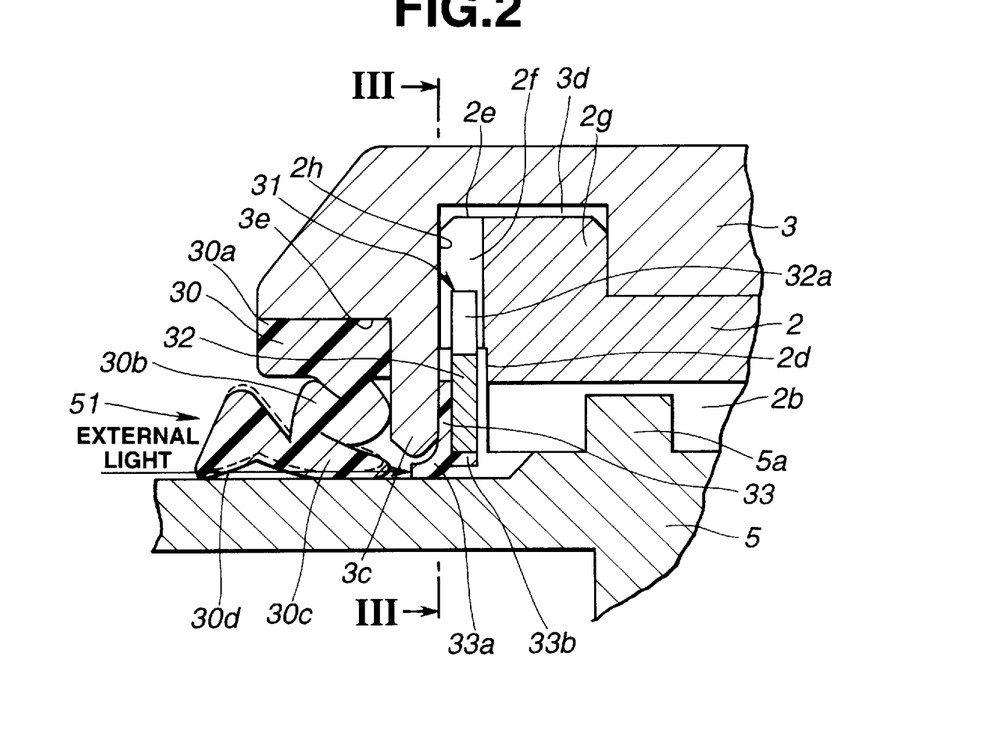
FIG. 2 is an enlarged sectional view of a primary part of a light shielding portion provided in the lens barrel which is the aforementioned first embodiment of the present invention.
Figure 3:
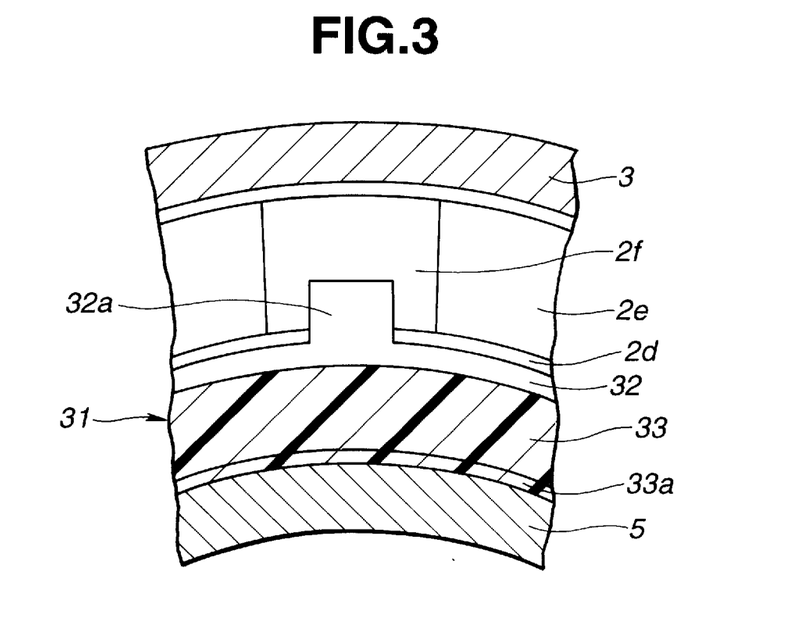
FIG. 3 is a sectional view taken along line III—III of FIG. 2.
Figure 4:
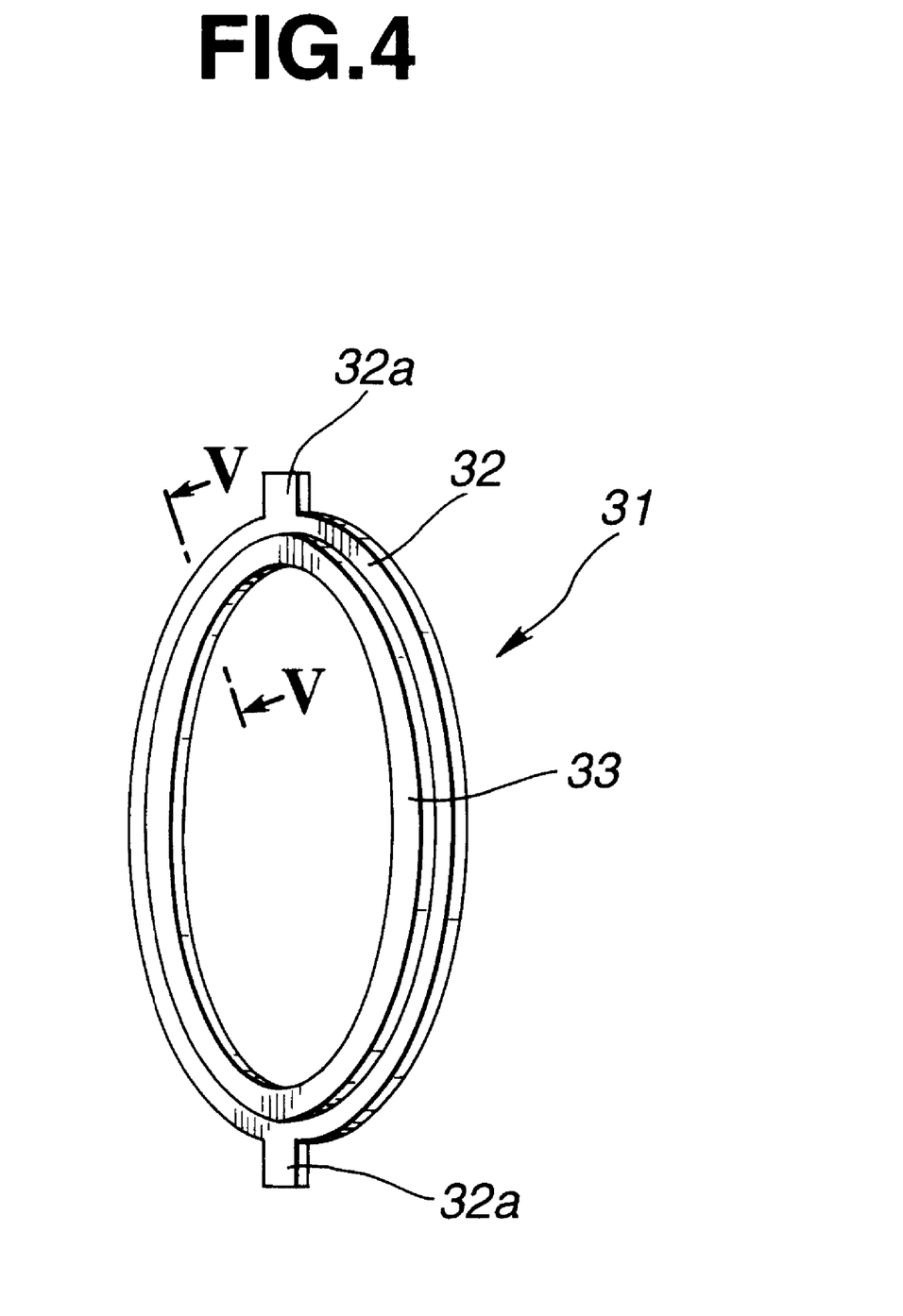
FIG. 4 is a perspective view of a light shielding ring of the aforesaid first embodiment.
Figure 5:
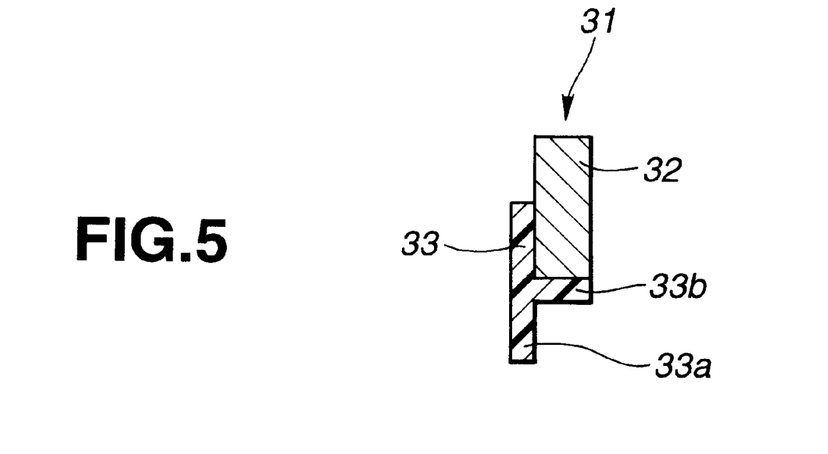
FIG. 5 is a sectional diagram showing the form of a section of a primary part of a lip portion of the aforesaid first embodiment and is a sectional view taken along line V—V of FIG. 4.

FIG. 2 is an enlarged sectional view of a primary part of a light shielding portion 51 provided in the lens barrel of FIG. 1. FIG. 3 is a sectional view taken along line III—III of FIG. 2. FIG. 4 is a perspective view of a light shielding ring. FIG. 5 is a sectional diagram showing the shape of a section of a primary part of a lip portion.

Before describing the configuration of the aforesaid light shielding portion 51, the configuration of the aforementioned stationary cylinder 2 and that of the end portion of the aforementioned rotary cylinder 3 will be described in more detail.

As shown in FIG. 2, an inwardly recessed or slotted step (or stage) part 3e for the placement of the light shielding portion is formed in the end surface portion of the aforementioned rotary cylinder 3. Thus, an end surface 2h of the aforementioned stationary cylinder 2 abuts against the inner surface of the inward flange 3c. A recessed step part 2d for the placement of a light shielding ring is formed in the inner-peripheral-side part of end surface portion 2h. As a result of the forming of this recessed step part 2d, a predetermined gap is formed between the back face of the aforementioned flange 3c and the surface of the outer peripheral surface of the recessed step part facing thereto. Further, radial grooves 2f, into each of which a dent projection portion 32a formed on the light shielding ring (to be described later) is fitted, are formed in the outer-peripheral-surface-side part of the end flange portion 2e of the stationary cylinder 2 at symmetrical positions, respectively (see FIGS. 2 and 3).

The aforementioned light shielding portion 51 consists of a light shielding member 30 and a shielding ring 31. The aforementioned light shielding ring 31 is composed of a supporting element 32 and a light shielding sheet 33, as shown in FIGS. 2, 3, 4 and 5.

The aforesaid supporting element 32 is constituted by a doughnut-shaped-disk-like metallic member in such a manner that this member has an outside diameter, which is less than the outside diameter of the aforementioned recessed step part 2d, and has an inside diameter which is greater than the outside diameter of the aforementioned linearly movable cylinder 5. The aforementioned pair of detent projection portions 32a and 32a are formed at symmetrical positions (see FIG. 4) on the outer peripheral surface of this supporting member 32 in such a manner as to be integral with each other.

The aforesaid light shielding sheet 33 is obtained by forming a ring-like element made of black silicon rubber on the aforementioned doughnut-like supporting element 32. This sheet 33 is a doughnut-shaped disk-like member which is made of a rubber material and is formed so that the outside diameter thereof is less than the outside diameter of the aforementioned supporting element 32 and that the inside diameter thereof is less than the outside diameter of the aforementioned linearly movable cylinder 5. Inner peripheral edge portion thereof is a lip portion 33a which pressure-contacts with the outer peripheral surface of the linearly movable cylinder 5. Ring-like projection portion 33b abutting against the inner peripheral surface of the aforesaid supporting element 32 is formed on the inner surface of this light shielding sheet 33. Incidentally, the aforementioned projection portion 33b is formed so that the projecting (or projection) height thereof is equal to the plate thickness of the aforesaid supporting element 32.

The aforementioned light shielding sheet 33 composes the aforementioned light shielding ring 31 together with the supporting element by securely fixing an inner-surface-side upper half thereof and an upper surface side portion of the projection portion 33b onto the supporting element 32 by forming (or molding). In this condition, a portion inwardly projected from the supporting element 32, namely, a portion inwardly projecting from the aforementioned projection portion of the aforesaid light shielding sheet 33 is the lip portion 33a. The inside diameter of lip portion 33a is less than the diameter of the linearly movable cylinder 5 in a natural state (or condition).

The aforementioned light shielding ring constructed in this manner is placed in the recessed step part 2d for the placement of the aforementioned light shielding ring in a state in which the detent projection portions 32a and 32a are engaged with the grooves 2f and 2f (incidentally, only one of these grooves is shown in FIGS. 2 and 3). In this state, the aforementioned lip portion 33a is pressure-contacted to the outer peripheral surface of the linearly movable cylinder 5 during being elastically deformed and bent.

A gap is formed in optical axis direction between the aforementioned recessed step part 2d and the cylinder 3 in such a manner as to be nearly equal to the thickness of the aforementioned light shielding ring 31 or is a little larger than the thickness of the aforementioned light shielding ring 31. When the aforementioned linearly movable cylinder 5 moves in the optical axis direction with respect to the stationary cylinder 2, the relative displacement in the optical axis direction between the light shielding ring 31 and the linearly movable cylinder 5 is performed.

Further, the aforementioned supporting element 32 is formed in such a manner as to be able to move in a radial direction by a predetermined distance with respect to the linearly movable cylinder 5. In the case that the aforementioned linearly movable cylinder 5 is eccentric with respect to the optical axis owing to the ricketiness or the like, the aforesaid light shielding ring 31 moves in the radial direction in a state, in which the aforementioned lip portion 33a is pressure-contacted to the outer peripheral surface of the aforesaid linearly movable cylinder 5, together with the cylinder 5 as a single piece.

Furthermore, the groove 2f is formed in the end portion of the aforementioned stationary cylinder 2 in such a way as to have a predetermined width in a direction of rotation with respect to the aforementioned detent projection portion 32a. Additionally, the aforementioned light shielding ring 31 has a predetermined degree of freedom in a direction of rotation of the aforesaid stationary cylinder 2.

Further, the aforementioned projection portion 32a is engaged with the aforesaid groove 2f so as to prevent the light shielding ring 31 from rotating more than a predetermined quantity even if the light shielding ring 31 receives a friction torque from the rotary cylinder 3. The width of the groove 2f is large relative to the projection portion 32a. This is because light rays are prevented from entering the camera from a gap formed owing to deformation of the lip portion 33a, which is caused as a result of pushing the projection portion 32a of the light shielding ring 31 against the wall of the groove 2f owing to the eccentricity of the linearly movable cylinder 5.

Rust-proof high-stiffness metallic materials, such as phosphor bronze and stainless steel, are employed as the materials of the aforementioned supporting element 32. Alternatively, an alloy obtained by mixing iron, copper and aluminum at a predetermined ratio may be used as the material of the supporting element 32.

Incidentally, the detent projection portions 32a of the aforementioned supporting element 32 are formed at two places on the outer periphery thereof in the case of this embodiment. However, the number of the detent projection portions 32a is not limited thereto. One or three or more projection portions 32a may be provided. Further, the aforementioned detent projection portions 32a can be utilized as connection (or joining) portions between supporting elements at the mass production thereof by manufacturing the aforesaid supporting elements 32 by pressing or etching. Moreover, needless to say, the sufficient light shielding effects of the present invention can be obtained even if the aforesaid projection portions 32a are not provided in the lens barrel.

On the other hand, the aforementioned light shielding member 30 is disposed just in front of the aforesaid lip portion 33a. Namely, the light shielding member 30 is disposed by bonding and fixing the base portion thereof onto the recessed step part which is formed at the front end portion of the rotary cylinder 5. This light shielding member 30 is a ring-like member formed in such a manner as to have an outside diameter, which is nearly equal to the inside diameter of the aforementioned rotary cylinder 3, and to have an inside diameter which is less than the outside diameter of the aforementioned linearly movable cylinder 5.

The section of this light shielding member 30 is shaped, as shown in FIG. 2, in such a manner as to include a rectangular base portion 30a which has an adhesion surface on the outer peripheral side thereof, a bending portion 30b extending from the inner peripheral side portion of the aforesaid base portion 30a, a front-side lip portion 30d extending from the aforesaid bending portion 30b to the front thereof, and a rear-side lip portion 30c extending from the aforesaid bending portion 30b to the rear thereof.

Further, in the case of this light shielding member 30, the adhesion surface of the aforementioned base portion 30a thereof is bonded and fixed to the inner peripheral surface of the aforesaid recessed step part 3e. Moreover, the aforementioned front-side lip portion 30d and the aforementioned rear-side lip portion 30c are pressure-contacted to the outer peripheral surface of the linearly movable cylinder 5.

Elastomer materials are desirable as the materials of the aforementioned light shielding member 30 and the light shielding sheet 33, because the lip portions thereof are required to undergo a large elastic deformation. Practically, rubber is an optimum material. In the case of this embodiment, silicon rubber or fluorine rubber, which excels in temperature resistance, moisture resistance (or waterproofness), chemical resistance and weather resistance (or weatherability), are employed.

Furthermore, a resin coating, for example, Teflon (a tradename of E. I. Du Pont de Nemours & Co.) is applied-in the aforementioned lip portion so as to prevent low-molecular-weight silicon resin or fluorine resin contained in the silicon rubber or the fluorine rubber from seeping therefrom and so as to reduce a sliding load. This resin coating is implemented by coating (or painting). However, silicon rubber and fluorine rubber are poor in wettability. Thus, the adhesion strength (or property) of the resin coating is improved by preliminarily applying a primer thereon.

Alternatively, xylene or the like may be coated thereon by utilizing CVD (Chemical Vapor Deposition) method. Incidentally, although the coefficient of friction in the case of this coating of xylene by using CVD method is higher than that in the case of coating Teflon-contained resin, uniform film can be formed, so that a stable operation of a light shielding ring can be achieved.

Operation and advantageous effects of the aforementioned light shielding portion 51 constructed as above described will be described hereinbelow.

In the aforementioned light shielding portion 51, external light being incident into the camera main body is fully blocked by the light shielding member 30 in a normal state, namely, in a state in which the stationary cylinder 2, the rotary cylinder 3 and the linearly movable cylinder 5 are not eccentric with respect to the optical axis. Thus, the (external) light does not enter directly the camera at all.

However, it is supposed that each of the aforementioned cylinders displaces with respect to the optical axis, that as a result, the rotary cylinder 3 is eccentric with respect to the stationary cylinder 2, and the linearly movable cylinder 5 is eccentric with respect to the stationary cylinder 2, that thus, the front-side and rear-side lip portions 30d and 30c of the light shielding member 30 are deformed by an eccentric amount (or quantity) of the cylinder and consequently, a gap is formed between the aforementioned linearly movable cylinder 5 and each of the front-side and rear-side lip portions 30d and 30c (namely, the front-side and rear-side lip portions 30d and 30c are put into a state indicated by dotted lines in FIG. 2), external light is incident through this gap and thus direct external light comes into the rear of the light shielding member 30.

However, this direct incident light is blocked by the lip portion 33a of the light shielding ring 31. Namely, in the case that the aforementioned stationary cylinder is eccentric with the optical axis, the aforesaid light shielding ring 31 moves together with the aforementioned linearly movable cylinder 5. Thus, the aforesaid lip portion 33a is in a state in which the aforementioned lip portion 33a is pressure-contacted to and held on the outer peripheral surface of the aforementioned linearly movable cylinder 5. Incident external light is blocked by this lip portion 33a.

Incidentally, the incident light directly reaching the aforementioned light shielding ring 31 without being blocked by the aforementioned light shielding member 30 is parallel with the aforesaid linearly movable cylinder 5 and passes within a hairbreadth of the outer peripheral surface of the aforesaid linearly movable cylinder 5 and thus is incident into the camera. Thus, this direct incident light impinges upon the end surface of the lip portion 33a of the aforementioned light shielding ring 31 (see FIG. 2).

In this case, the length of a part of the aforementioned lip portion 33a, which is pressure-contacted to the linearly movable cylinder 5, is equal to the thickness of the lip portion 33a. Thus, even if the light shielding sheet 33 is formed so that the thickness thereof is small, the lip portion 33a has a sufficient thickness for the incident light.

In other words, the aforementioned light shielding sheet 33 can be formed in such a way as to have a small thickness.

Applicant of the present invention verifies by experiment that the minimum thickness of the lip portion 33a of the light shielding sheet 33 can be reduced to 0.1 mm.

Incidentally, in the case that the silicon-rubber lip portion 33a, into which 5 percent by weight or so of black pigment made of carbon or iron oxide is mixed (incidentally, the properties of silicon rubber are deteriorated if 5 percent by weight or more of the pigment is mixed thereinto), of the light shielding sheet 33 is formed in such a way as to have a thickness of 0.1 mm, this lip portion 33a transmits a little quantity of external light but has sufficient light shielding performance in blocking indirect light such as reflection light.

However, as above stated, the length of a part of the aforementioned lip portion 33a, which is pressure-contacted to the outer peripheral surface of the linearly movable cylinder 5 is the thickness thereof for the direct light. Thus, the thickness of the sheet for the direct light can be gained. Consequently, external light is not transmitted by the aforesaid lip portion 33a and does not enter the camera main body at all.

Surfaces of the aforementioned light shielding member 30 and the aforesaid light shielding sheet 33 are coated with a lubricant, which is obtained by mixing Teflon particles into a resin, so as to reduce sliding resistance. Thus, the lip portion 33a is not a large load on the outer peripheral surface of each of the cylinders, such as the linearly movable cylinder 5 and can slide thereon.

Further, the aforementioned light shielding ring 31 is configured in such a manner as to be able to slide by a predetermined amount (or distance) in a thrust direction and in a direction of rotation thereof. Moreover, the surface of the aforementioned light shielding sheet 33 is coated with Teflon resin or the like, so that when driving the aforementioned lens barrel 1, the friction between the flange 3c and the light shielding sheet 33 can be alleviated and stress applied onto the aforementioned supporting element 32 can be reduced.

Thus, if the supporting element 32 is formed so that the plate thickness and the ring width thereof are small, the stiffness of the supporting element 32 can be maintained. In the case of this embodiment, the aforementioned supporting element 32 is formed in such a manner as to be very small. Namely, the plate thickness is 0.2 mm; the ring width is 0.7 mm; the width of the ring portion of the light shielding ring including the lip portion is 1 mm; and the plate thickness in the optical axis direction of the supporting element including the lip portion is 0.3 mm.

Incidentally, the plate thickness of the aforementioned supporting element 32 may be reduced to, for instance, 0.01 mm or so at which opaqueness to visible light can be obtained if the design stiffness is obtained.

Therefore, as compared with the conventional similar light shielding ring, the aforementioned light shielding ring 31 is reduced in size so that the plate thickness is decreased by a factor of 2 and the ring width is decreased by a factor of 3 or so.

Although this embodiment is provided with the aforementioned light shielding member 30 as the light shielding portion, in addition to the aforementioned light shielding ring 31, this light shielding member 30 does not have to be of the high-performance type that external light is fully blocked even if the aforementioned cylinders are eccentric with respect to one another. Thus, the configuration thereof can be simplified. Moreover, the miniaturization thereof can be easily achieved.

Thus, in accordance with the first embodiment, there is provided a lens barrel for a camera, by which the friction between the light shielding member and the barrel is low, and the sizes in the direction of the optical axis of a lens and in the radial direction of the barrel are small, and the configuration is simple, and light is blocked between the barrels and between the barrel and the outer cover for the camera main body.

Next, a modification of the aforementioned lip portion employed in the first embodiment will be described hereinbelow.

Figure 6:
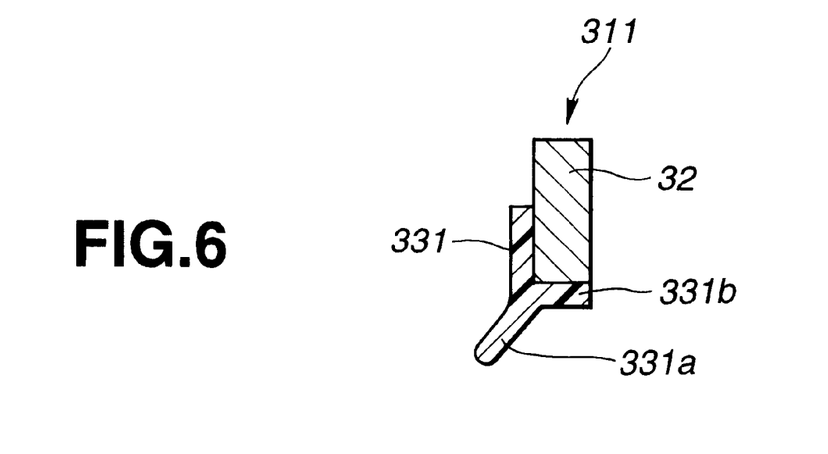
FIG. 6 is a sectional diagram showing the shape of a section of a primary part of a first modification of the lip portion of the aforesaid first embodiment.
Figure 7:
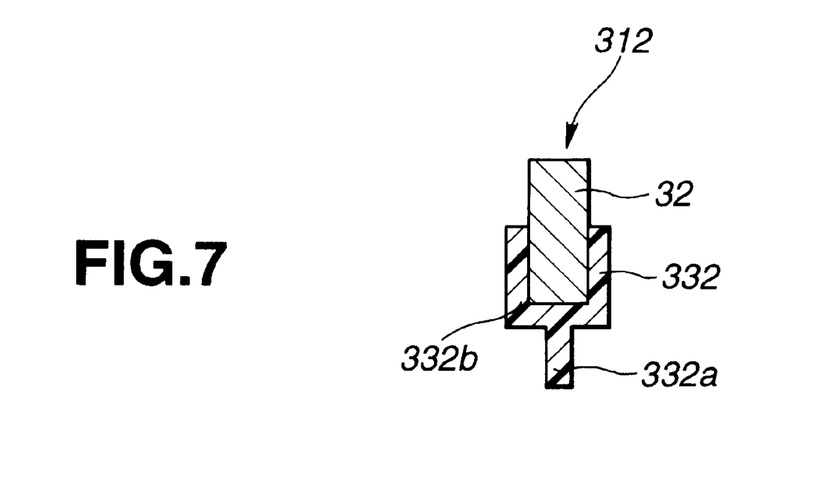
FIG. 7 is a sectional diagram showing the shape of a section of a primary part of a second modification of the lip portion of the aforesaid first embodiment.

FIGS. 6 and 7 illustrate other examples of the light shielding sheet 33 in the aforementioned light shielding ring 31.

As is indicated in the sectional form, the light shielding ring 311 shown in FIG. 6 is different from the aforementioned light shielding ring 33 shown in FIG. 5 in that the lip portion 331a is formed in such a manner as to form a predetermined angle with the supporting element 32 and in that the aforesaid lip portion 331a is formed so that the section of an end portion thereof is shaped like a semicircle.

Thus, a bending direction, in which the lip portion 331a of the light shielding sheet is bent, is determined by forming the lip portion in such a way as to extend at predetermined angle with respect to the supporting element 32 and as to have the surface of a circular cone as a whole. Hence, when the light shielding ring 311 is equipped in the linearly movable cylinder 5, a stable operation of the light shielding ring is achieved. Moreover, an edge-like portion is eliminated or rounded by forming the end portion of the lip portion 331a in such a way as to have a section thereof shaped like a semicircle. Consequently, a smoother operation of the aforementioned light shielding ring 331 is achieved.

Further, a light shielding ring 312 illustrated in FIG. 7 is formed so that a light shielding sheet 332 has a bonding fixation portion 332b, whose section is shaped like a letter "C", to be bonded to the supporting element 32. The lip portion 332a is formed in such a manner as to extend downwardly and perpendicularly from the seat or bottom part of this bonding fixation portion 332b.

As a result of forming the light shielding sheet, a stronger securing force exerted between the aforementioned light shielding sheet 332 and the aforesaid supporting element 32 can be realized.

Incidentally, needless to say, the securing and forming of the lip portion onto the supporting element 32 can be achieved by securing and forming the lip portion only on the inner peripheral surface thereof. In this case, the thickness in the optical axis direction of the light-shielding ring can be minimized.

Further, in the case of the light shielding sheets illustrated in FIGS. 5, 6 and 7, even when the metallic supporting element 32 is pushed against the linearly movable cylinder 5, the projection portions 33b and 331b and the bonding fixation portion 332b to be bonded to the inner peripheral surfaces of the aforementioned supporting element 32 can prevent the aforementioned supporting element 32 from being brought into contact with the aforesaid linearly movable cylinder 5 and damaging the outer peripheral surface of the cylinder 5.

In the case of this embodiment, the aforementioned light shielding sheets are shaped, as illustrated in FIGS. 5, 6 and 7 herein-above described, in such a manner as to be provided with the projection portions 33b and 331b and the bonding fixation portion 332b, which abut against the entire inner-peripheral-surface of the supporting element 32. However, similar advantageous effects can be obtained by providing portions at three or more places on the inner peripheral surface of the supporting element 32, respectively.

Figure 8:
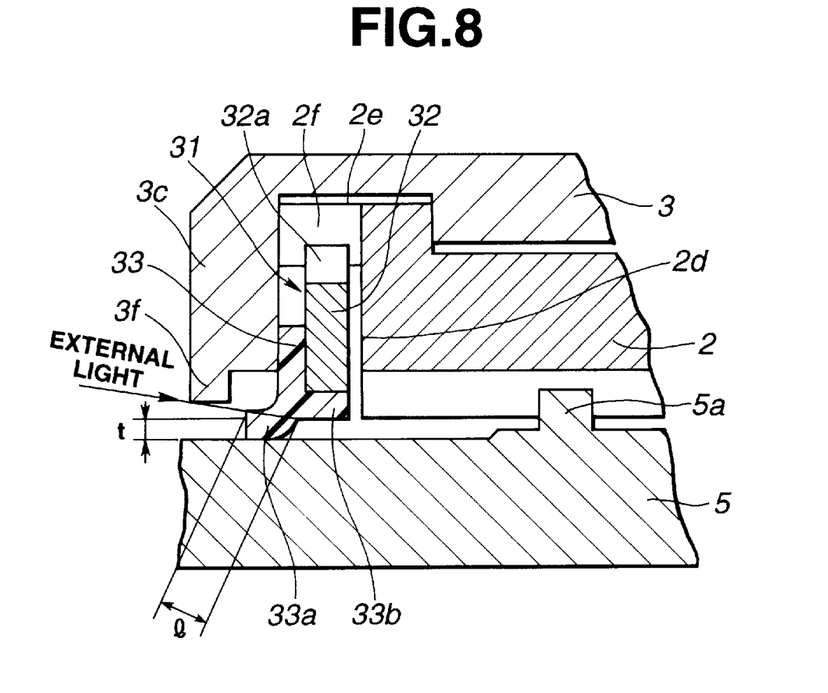
FIG. 8 is an enlarged sectional view of a primary part of a light shielding portion provided in a lens barrel which is a second embodiment of the present invention.

Next, the second embodiment of the present invention will be described hereinafter. FIG. 8 shows a lens barrel which is the second embodiment of the present invention.

This second embodiment differs from the aforementioned first embodiment in that a ring-like inward flange having an inside diameter, which is a little larger than the outside diameter of the linearly movable cylinder 5, is protrusively formed as a light shielding member 3f in place of the light shielding member 30 employed in the aforementioned first embodiment. The remaining composing elements of the second embodiment are nearly similar to the corresponding composing elements of the aforementioned first embodiment. Therefore, in this figure, the same reference characters are indicated in such a manner as to designate like members of the first embodiment, and the description of such composing elements is omitted herein.

FIG. 8 illustrates a condition in which the linearly movable cylinder 5 is eccentric with respect to the stationary cylinder 2 and the rotary cylinder 3 is eccentric with respect to the aforementioned stationary cylinder 2 and in which the aforementioned rotary cylinder 3 and the aforesaid linearly movable cylinder 5 are most eccentric with the stationary cylinder 2.

When external light is incident in such a condition, the incident light is restricted by the light shielding member 3f provided at the front end of the rotary cylinder 3. At that time, external light, which is inclined a largest angle from the optical axis and is indicated by an arrow in this figure, cannot be incident into the camera main body if this external light passes through a portion having a thickness 1 which is sufficiently large in comparison with the thickness t of the aforementioned lip portion 33a. Therefore, the second embodiment can obtain sufficient light shielding effect without forming the lip portion in such a manner as to have a thickness, at which direct (external) light can be completely blocked, similarly as in the case of the aforementioned first embodiment.

Thus, in the case of this second embodiment, a light shielding member 30, which is employed in the aforementioned first embodiment, can be formed by using a flange provided in front of the lip portion 33a.

Figure 9:
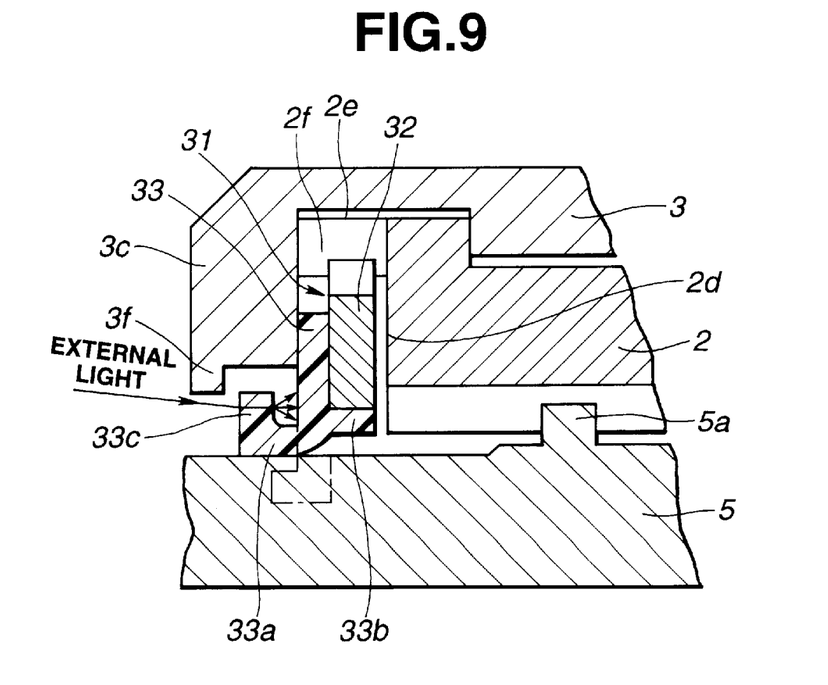
FIG. 9 is an enlarged sectional view of a primary part of a light shielding portion provided in a lens barrel which is a third embodiment of the present invention.

Next, the third embodiment of the present invention will be described hereinbelow. FIG. 9 shows a lens barrel which is the third embodiment of the present invention.

This third embodiment differs from the aforementioned first and second embodiments in the shape of the employed light shielding sheet. Namely, in the case of the third embodiment, a ring-like projection piece 33c protruding forwardly is formed at an end portion of the lip portion 33a, which hangs downwardly and perpendicularly in the natural state, of the light shielding sheet 33. The remaining composing elements of the third embodiment are similar to the corresponding composing elements of the aforesaid second embodiment. Therefore, in this figure, the same reference characters are indicated in such a manner as to designate like members of the first embodiment, and a description of such composing elements is omitted herein.

Incidentally, FIG. 9 illustrates a condition in which the linearly movable cylinder 5 is eccentric with respect to the stationary cylinder 2 and the rotary cylinder 3 is eccentric with respect to the aforementioned stationary cylinder 2 and in which the aforementioned rotary cylinder 3 and the aforesaid linearly movable cylinder 5 are most eccentric with the stationary cylinder 2, similarly as in the case of the aforementioned second embodiment.

When the aforementioned light shielding ring 31 is incorporated into the aforesaid linearly movable cylinder 5, the aforementioned projection piece 33c of the light shielding sheet 33 is placed perpendicularly to the optical axis. Further, external light, which is not blocked but is incident directly into the camera main body, is first incident into the aforementioned projection piece 33c. Light having passed through this projection piece becomes scattered light. This scattered light is completely blocked by the lip portion 33a which is provided in such a way as to link with this projection piece 33c. Thus, this third embodiment can obtain sufficient light shielding effect without forming the lip portion 33a in such a manner as to have a thickness, at which direct (external) light can be completely blocked, similarly.

Thus, in the case of this third embodiment, the light shielding portion can be formed by employing a simpler configuration, similarly as in the case of the aforementioned second embodiment.

As above described, in accordance with the aforementioned embodiments, the light shielding portion can be formed in such a way as to be accommodated in a space whose size in the optical axis direction decreases by a factor of 2 and whose size in the radial direction decreases by a factor of 3, as compared with the space required in the case of the conventional light shielding portion. Thus, in the case of the aforementioned embodiments, the light shielding portion can be formed in such a manner as to be very compact in size. Further, the light shielding ring has a simple structure. Thus, the light shielding ring can be manufactured by performing molding (or forming) on ring-like plate materials. Consequently, the manufacturing cost thereof can be cut down to a low value.

Furthermore, regarding a working force quantity which is the problem of the conventional device, a drive load at the time of operating a lens barrel can be reduced because the lip portion can be formed so that the thickness thereof is very small, namely, 0.1 mm or so.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A lens barrel, comprising:
    first and second lens frames, adapted to be able to make a relative displacement therebetween and adapted so that an inner peripheral portion of said first lens frame overlaps with an outer peripheral portion of the second lens frame even when the first and second lens frames are fully extended in a used state;
    a light shielding portion, provided at one end portion of said first lens frame and which overlaps said second lens frame, for blocking light, which is incident on said one end portion in the used state, from entering between said first and second lens frames; and
    a pressure-contact light shield member that is provided in a recess in an end portion of the inner periphery of said first lens frame, which recess is located further inwardly from said one end portion of said first lens frame than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame.

2. The lens barrel according to claim 1, wherein said pressure-contact light shielding member comprises: a substantially flat, ring-like supporting element which possesses stiffness; and an elastic member has a thin lip portion which is fixed to said supporting element and is adapted to be pressure-contacted to an outer peripheral surface of said second lens frame by being elastically deformed.

3. The lens barrel according to claim 1, wherein said pressure-contact light shielding member and said first lens frame are adapted to be able to move in a direction of an optical axis of said first lens frame but to be unable to rotate each other in a direction of rotation thereof.

4. The lens barrel according to claim 1, wherein said light shielding portion blocks part or all of external light entering from a gap between said first lens frame and said second lens frame.

5. The lens barrel according to claim 1, wherein said light shielding portion is a flange portion formed in said first lens frame.

6. The lens barrel according to claim 1, wherein an elastic member, which is adapted to be pressure-contacted to an outer peripheral surface of said second lens frame and to first block light, is provided in said flange portion.

7. A lens barrel according to claim 1 wherein the recess in the inner peripheral portion of said first lens frame is a narrow annular recess extending radially outward and away from said inner peripheral portion; and said light shield member is a thin member positioned in said narrow recess.

8. A lens barrel according to claim 7 wherein said light shield member has a thickness of less than 1 millimeter measured in the optical axis direction.

9. A lens barrel according to claim 7 wherein said light shield member is comprised of a ring-shaped support member formed from a flat plate and having an outer periphery diameter less than a depth of said narrow recess and an inner diameter greater than an outer diameter of the outer peripheral portion of said other of said first and second frames, and an annular resilient member having an outer portion secured to said ring-shaped support member and an inner portion whose inner end has a diameter less than said outer peripheral portion causing the inner portion to flex when making pressure contact with said outer peripheral portion.

10. A lens barrel according to claim 9 wherein said ring-shaped support member is provided with at least one integral projection extending radially outward from an outer edge thereof; and said narrow recess having a portion thereof for receiving said projection and being wider than a width of said integral projection measured in a circumferential direction to enable said support member to undergo limited rotation about said optical axis to compensate for eccentricities of said first and second lens frames.

11. A lens barrel according to claim 1 wherein said support member has a stiffness greater than said resilient member.

12. A lens barrel comprising:

first and second lens frames, adapted to be able to make a relative displacement therebetween and adapted so that an inner peripheral portion of said first lens frame overlaps with an outer peripheral portion of the second lens frame in a used state;

a light shielding portion, provided at one end portion of said first lens frame and which overlaps said second lens frame, for blocking light which is incident on said one end portion in the used state; and a pressure-contact light shield member that is provided in a recess in an end portion on the inner periphery of said first lens frame which recess is located from said one end portion of said first lens frame than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame; said pressure-contact light shielding member comprising: ring-like supporting element which possesses stiffness; and an elastic member has a thin lip portion which is fixed to said supporting element and is adapted to be pressure-contacted to an outer peripheral surface of said second lens frame by being elastically deformed, said lip portion being held in such a way as to be positioned in a thrust direction and to be able to displace in a radial direction with respect to said second lens frame.

13. A lens barrel comprising:

first and second lens frames, adapted to be able to make a relative displacement therebetween and adapted so that an inner peripheral portion of one of said first and second lens frames overlaps with an outer peripheral portion of an other of the first and second lens frames in a used state;

a light shielding portion, provided at one end portion of said first lens frame, for blocking light which is incident from said end portion in the used state; and a pressure-contact light shield member that is provided at a place which is further inward from said one end portion of said first lens frame than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame, said pressure-contact light shielding member comprising: a ring-like supporting element which possesses stiffness and has a convex projection portion; and an elastic member that is provided in such a manner as to be integral with said ring-like supporting member and that has a thin lip portion which is fixed to said supporting element and is adapted to be pressure-contacted to an outer peripheral surface of said second lens frame by being elastically deformed, and wherein a concave groove portion, with which said projection portion engages, is formed in an inside diameter portion of said first lens frame in such a manner that said pressure-contact light shielding member is adapted to be able to move in a direction of an optical axis of said first lens frame but to be unable to rotate with respect to said first lens frame in a direction of rotation thereof.

14. A lens barrel comprising:

first and second lens frames, adapted to be able to make a relative displacement therebetween and adapted so that an inner peripheral portion of said first lens frame overlaps with an outer peripheral portion of the second lens frame even when the first and second lens frames are fully extended in a used state;

a light shielding portion, provided at one end portion of said first lens frame and which overlaps said second lens frame, for blocking light which is incident on said one end portion in the used state from entering between said first and second lens frames; and a pressure-contact light shield member that is provided in a place along the inner periphery of said first lens frame which is further inward from said one end portion of said first lens frame than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame;

said pressure-contact light shielding member comprising: a substantially flat, ring-like supporting element which possesses stiffness; and an elastic member has a thin lip portion which is fixed to said supporting element and is adapted to be pressure-contacted to an outer peripheral surface of said second lens frame by being elastically deformed, said lip portion protruding toward said first lens frame and has a ring-like inside diameter part, whose section is shaped like a letter L, and blocks light by said L-shaped part and a base part for supporting said L-shaped part in a duplex manner, when positioned by said second lens frame in a used state.

15. A lens barrel comprising:

a first lens frame fixed to or displacably provided in a camera main body;

a second lens frame, provided in said first lens frame in such a manner as to be able to make a relative displacement with respect to said first lens frame;

a light shielding portion, provided at one end portion of said first lens frame, for blocking light which is incident from said end portion in a used state; and a pressure-contact light shield member that is provided in a recess at one end of an inner periphery of said first lens frame, which recess is further inward from said one end portion than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame.

16. The lens barrel according to claim 15, wherein said pressure-contact light shielding member comprises: a ring-like supporting element which possesses stiffness; and an elastic member has a thin lip portion which is fixed to said supporting element and is adapted to be pressure-contacted to an outer peripheral surface of said second lens frame by being elastically deformed.

17. The lens barrel according to claim 16, wherein said light shielding portion provided in said first lens frame reduces a quantity of external light entering from a gap between said first lens frame and said second lens frame and also reduces an amount of external light reaching a vicinity of said thin lip portion.

18. The lens barrel according to claim 16, wherein said elastic member is displaced from an outer peripheral portion of a supporting element, and wherein the outer peripheral portion of said supporting element is exposed.

19. A lens barrel comprising:

a first lens frame fixed to or displacably provided in a camera main body;

a second lens frame, provided in said first lens frame in such a manner as to be able to make a relative displacement with respect to said first lens frame;

a light shielding portion, provided at one end portion of said first lens frame, for blocking light which is incident from said end portion in a used state; and a pressure-contact light shield member that is provided in a recess at one end of an inner periphery of said first lens frame, which recess is further inward from said one end portion than said light shielding portion provided at the one end portion thereof and that is adapted to be elastically deformed by being pressure-contacted to an outer peripheral portion of said second lens frame, thereby blocking light transmitted by said light shielding portion provided at the one end portion of said first lens frame and, wherein said pressure-contact light shielding member comprises: a ring-like supporting element which possesses stiffness and has a convex projection portion; and an elastic member that is provided in such a manner as to be integral with said ring-like supporting member and that has a thin lip portion which is fixed to said supporting element and is adapted to be pressure-contacted to an outer peripheral surface of said second lens frame by being elastically deformed, and wherein a concave groove portion, with which said projection portion engages, is formed in an inside diameter portion of said first lens frame in such a manner that said pressure-contact light shielding member is moveable in a direction of an optical axis of said first lens frame but is prevented from rotating with respect to said first lens frame in a direction of rotation thereof.

* * * * *

UNITED STATES PATENT AND TRADEMARK OFFICE
CERTIFICATE OF CORRECTION

PATENT NO. : 6,024,457
DATED : February 15, 2000
INVENTOR(S) : Kawai et al

Page 1 of 1

It is certified that error appears in the above-identified patent and that said Letters Patent is hereby corrected as shown below:

IN THE INVENTORS SECTION [75]

Line 1, after "Hachioji", insert -- Tokyo --.
Line 2, after "Suzuki", insert -- Setagaya --.
Line 3, after "Hino", insert -- Tokyo --.
Line 3, after "Akiruno", insert -- Tokyo --.
Line 4, after "Hino", insert -- Tokyo --.

Column 5,
Line 19, delete the word "this".
Line 22, after the word "aforementioned" insert the word -- stationary --.

Signed and Sealed this

Thirty-first Day of July, 2001

*Attest:*

NICHOLAS P. GODICI
*Attesting Officer*   Acting Director of the United States Patent and Trademark Office